United States Patent Office

3,752,797
Patented Aug. 14, 1973

3,752,797
MIXED CATALYST FOR THE POLYMERIZATION OF α-OLEFINS
Wolfgang Gordon, Hofheim, Taunus, Kurt Rust, Frankfurt am Main, and Erwin Schrott, Sulzbach, Taunus, Germany, assignors to Farbwerke Hoechst Aktiengesellschaft vormals Meister Lucius & Brüning, Frankfurt am Main, Germany
No Drawing. Filed Nov. 5, 1971, Ser. No. 196,196
Claims priority, application Germany, Nov. 7, 1970, P 20 54 950.2
Int. Cl. C08f 3/10, 1/44, 1/56
U.S. Cl. 260—93.7   13 Claims

ABSTRACT OF THE DISCLOSURE

Process for the polymerization of α-olefins by means of a mixed catalyst composed of a phosphoric acid-N-alkylamide, a cyclopolyalkene, a halogen compound of trivalent titanium and a halogen-free organo-aluminium compound. Products of improved stereospecificity are obtained with a good catalyst-time-yield.

---

The present invention relates to a mixed catalyst for the polymerization of α-olefins.

It is known that α-olefins and di-olefins, especially ethylene, propylene, butene-1 and 4-methylpentene can be polymerized to obtain high molecular weight polyolefins at relatively low pressures and temperatures in the presence of catalysts composed of compounds of the elements from Subgroups IV to VIII of the Periodic Table and of compounds of Main Groups I to III of the Periodic Table having a reducing or alkylating effect. In these low pressure polymerizations, above all catalyst mixtures of titanium tetrachloride or titanium subhalides with organo-aluminium compounds have proved to be advantageous. The catalysts used in these low pressure polymerization processes are known as Ziegler catalysts and are described for example in Belgian Patent No. 533,362.

By polymerization of propylene and higher α-olefins in the presence of the aforementioned catalysts, apart from well crystallized polymers which under the polymerization conditions are insoluble or sparingly soluble in the hydrocarbons used as dispersing agents, also amorphous, easily soluble polymers and oils are obtained. According to Natta, the well crystallized polymers are in steric order and therefore called "isotactic," while the soluble polymers are not in steric order and thus are called "atactic."

For plastics, the isotactic polypropylene of highest crystallinity is especially interesting. The formation of isotactic or amorphous poly-α-olefins is controlled by the catalyst system. For economic reasons, catalyst systems having a selective effect which enhance the exclusive or nearly exclusive formation of the desired polymers are required. These catalyst systems should be as active as possible in order to obtain very highly stereospecific poly-α-olefins, the ash content of which is so insignificant as to obviate a subsequent removal of ashes by a corresponding work-up. Especially advantageous in view of such a process free from any work-up is a polymerization in the gaseous phase.

A catalyst system for the preparation of isotactic poly-α-olefins, especially of polypropylene, having a highly selective effect, is based on TiCl$_3$ prepared by reduction of TiCl$_4$ with H$_2$, or on TiCl$_3$·⅓AlCl$_3$, prepared by reduction of TiCl$_4$ with aluminium, and on aluminium triethyl (Natta et al., Gazz. Chim. Ital. 87, Fasc. V. 528, 549, 570 (1957)). However, using these systems, more than 20% of atactic poly-α-olefins still are obtained. If, for example in the case of polymerization in the gaseous phase, this portion is not removed, products having poor hardness are obtained.

The proportion of atactic poly-α-olefins is considerably lower when aluminium triethyl is replaced by diethyl-aluminium monochloride or ethyl-aluminium-sesquichloride. However, the catalyst activity thus is decreased to such a degree as to obtain a very high ash content and an increased halide proportion by a work-up-free gas-phase polymerization.

In numerous patents, processes are described according to which the stereospecificity of the polymerization of α-olefins in the presence of TiCl$_3$ and aluminium trialkyls as catalyst system can be increased by additives, such as for example:

carboxylic acids (British Patent No. 907,386),
carboxylic acid amides, thiocarboxylic acid amides (Belgian Patent No. 608,463, U.S. Patent No. 3,205,208),
tertiary amines (U.S. Patent No. 3,050,471, Australian Patent No. 247,451),
pyridine/H$_2$O (U.S. Patent No. 3,189,591),
multivalent amines (Belgian Patent No. 626,253),
amino alcohols (British Patent No. 971,248),
polycyclic aromatic hydrocarbons, such as indene, naphthalene (U.S. Patents Nos. 2,914,515 and 3,278,511), anthracene,
alkaline cyclopentadienyl (U.S. Patent No. 3,334,079),
lithium hydride (German Auslegeschrift No. 1,240,668),
acetone (German Auslegeschrift No. 1,098,175),
thiocresol, alkanol amine salt (British Patent No. 922,537),
multivalent ethers, amino ethers (German Auslegeschrift No. 1,214,401) and amino ketones.

These proposed additives have the following drawbacks: either the catalyst system TiCl$_3$/aluminium trialkyl has poor activity, or, at a higher activity rate, the stereospecificity substantially decreases. A further drawback of the proposed systems resides in a poor reproducibility with respect to the isotactic/atactic ratio.

A catalyst system which mostly eliminates the cited disadvantages is described in Belgian Patents Nos. 728,519 and 728,520. This is done by adding cyclo-polyalkenes having 7 or 8 ring members and 3, or 3 or 4 non-cumulated double bonds. In a work-up-free gas-phase polymerization at high polymerization speed, poly-α-olefins having a relatively low atactic rate are obtained, the hardness degree of the product thus being relatively high.

A process has now been found for the polymerization of α-olefins of the general formula CH$_2$=CH—R, in which R is an aliphatic radical having up to 4 carbon atoms, and of mixtures of these α-olefins with themselves and/or ethylene having an ethylene content of up to 5% by weight, and for the block copolymerization of these α-olefins with or without ethylene having an ethylene content of up to 25% by weight in suspension or in the gaseous phase at temperatures of from 20° to 130° C. and pressures of from 0 to 50 atmospheres/gage, which comprises carrying out the polymerization in the presence of a mixed catalyst composed of:

(1) A phosphoric acid-N-alkylamide of the formula $$O=P\begin{pmatrix}N\begin{pmatrix}R\\R\end{pmatrix}\\N\begin{pmatrix}R\\R\end{pmatrix}\\N\begin{pmatrix}R\\R\end{pmatrix}\end{pmatrix}$$

in which R stands for identical or different aliphatic hydrocarbon radicals having up to 4 carbon atoms, and in which the radicals R may also be linked with each other (component A), (2) A cyclopolyalkylene having 7 or 8 ring members and 3, or 3 or 4 non-cumulated double bonds, respectively, in the ring, or the alkyl and alkoxy substituted derivatives thereof, the alkyl radical containing from 1 to 4 carbon atoms (component B), (3) A halogen compound of trivalent titanium (component C), and (4) A halogen-free organo-aluminium compound (component D).

As component A, phosphoric acid hexamethyl-trisamide is preferably used. Good results are also obtained using other amides, for example phosphoric acid hexaethyl-trisamide or phosphoric acid trisethylene-imide. The molar ratio of component A to component C may be widely varied and is from 0.05 to 5, preferably from 0.2 to 2.

Appropriate substances for mixed catalyst component B are cycloheptatriene-(1,3,5) and/or norcaradiene, and the alkyl or alkoxy substituted derivatives of cycloheptatriene and/or norcaradiene, the alkyl radical containing from 1 to 4 carbon atoms, for example methylcycloheptatriene, dimethylcycloheptatriene or methoxycycloheptatriene. The molar ratio of component B to component C in the process of the invention is in this case from 0.1 to 1.5, preferably from 0.2 to 1.0. Furthermore appropriate as mixed catalyst component B are cyclooctatetraene and cyclooctatriene, the mixtures thereof, the derivatives thereof monosubstituted by alkyl or alkoxy groups, and their mixtures, the alkyl or alkoxy radical having from 1 to 4 carbon atoms, for example methylcyclo-octatetraene, dimethylcyclo-octatetraene, butoxycyclo-octatetraene. The molar ratio of component B to component C in this case is from 0.1 to 2.5, preferably from 0.2 to 1.5.

As halogen compounds of trivalent titanium (component C), preferably chlorine compounds are used in the process of the invention, which were prepared by reduction of $TiCl_4$ by means of Al, $H_2$ or organo-aluminium compounds. Especially advantageous is $TiCl_3 \cdot \frac{1}{3} AlCl_3$.

As halogen-free organo-aluminium compounds (component D), above all branched or unbranched, unsubstituted aluminium alkyls are employed, for example aluminium trimethyl, aluminium triethyl, aluminium triisobutyl, aluminium tri-di-isobutyl and aluminium isoprenyl. Especially appropriate is aluminium triethyl. The molar ratio of component D to component C in the process of the invention is from 0.5 to 15, preferably from 1.0 to 8.

The catalyst components may be employed as pure substances, in the form of solutions, liquid inert hydrocarbons being preferred solvents in this case, or adsorbed on a carrier. The poly-α-olefin to be prepared is the most advantageous carrier material. The catalyst components are mixed either in the polymerization vessel or, by an appropriate method, before they are fed into the polymerization vessel.

The quantities of both the mixed catalyst components C and D used in the polymerization process of the invention depend on the monomer which is to be polymerized, on the kind of components C or D and furthermore on the fact whether the polymerization is carried out in suspension, without or under pressure, or in the gaseous phase. In the case of the suspension process, the amount used of catalyst component C generally will be from 0.05 to 10 millimols per liter of dispersing agent, preferably from 0.1 to 5 millimols per liter of dispersing agent. In the case of a gas-phase polymerization, from 0.005 to 1 millimol per liter of reactor volume, preferably from 0.05 to 0.5 millimol, is required.

In accordance with the process of the invention, all α-olefins of $CH_2=CH-R$ structure, in which R is $C_nH_{2n+1}$ and $n$ is 1–4, for example propylene, butene, hexene, 4-methylpentene, may be polymerized. The advantages show most clearly in the polymerization of propylene. Good results also are obtained in the polymerization of mixtures of α-olefins with themselves and/or with ethylene, the ethylene content being up to 5% by weight, preferably up to 2.5% by weight. The process furthermore is appropriate for the block copolymerization of the aforementioned α-olefins without or with ethylene, the content of ethylene units in this case being up to 25% by weight, preferably up to 15% by weight.

The process of the invention may be carried out in the presence of a liquid, preferably inert aliphatic hydrocarbons having a boiling range of from 60° to 180° C., or of liquified α-olefins, in which case the crystallized poly-α-olefin precipitates. Especially advantageous is the process of a polymerization in the absence of a liquid diluent, since in this case the atactic portion is not separated and the advantages of the process of the invention thus are most evident.

The temperature range of the process of the invention is from 20° to 130° C. In the suspension polymerization, the temperatures preferably are in the range of from 40° to 80° C., and in the gas-phase polymerization, they are preferably from 70° to 110° C.

The pressure range of the process of the invention is from 0 to 50 atmospheres/gage. When the suspension polymerization is carried out in an inert aliphatic suspension agent, a pressure in the range of from 0 to 12 atmospheres/gage is preferred. In the case of a suspension polymerization in a liquified α-olefin and in the case of a gas-phase polymerization, a pressure of from 15 to 45 atmospheres/gage is advantageous, a pressure of from 25 to 40 atmospheres/gage being especially preferable.

Using the aforementioned polymerization techniques, the process of the invention may be carried out continuously as well as discontinuously.

An advantage of the process resides in the fact that the polymerization of α-olefins is proceeding with a high degree of stereospecificity. In a work-up-free gas-phase polymerization, poly-α-olefins, for example polypropylene, can be obtained having a portion which can be extracted in boiling heptane and which is less than 10% by weight at a reduced specific viscosity of the product of 10 deciliters/gram, measured in a 0.1% Dekalin solution at 135° C. (Example 2). For reasons of greater independence of the reduced specific viscosity, ball indentation hardnesses measured according to DIN 53,456, are used for evaluation. According to the process of the invention, in work-up-free gas-phase polymerizations, for example of propylene, ball indentation hardnesses of more than 600 kiloponds per $cm.^2$ are obtained (Example 2). In the case of a suspension polymerization, the high stereospecificity of the poly-α-olefins is expressed in a small amount soluble in the suspension agent. In other processes which for example provide the omission of component A or B, a decreased stereospecificity results (Examples 1 and 10, Comparative Tests 1, 2, 10 and 11).

Further advantages of the process result from the high activity degree of the catalyst mixture in accordance with the present invention. High polymerization speeds can be achieved using extremely small amounts of the aforementioned catalyst mixture, thus obtaining high reactor throughput yields in the process of the invention. Despite a high stereospecificity, polymer yields of more than 500 grams per millimol of titanium-III-halogen compound can be obtained, so that, especially in the gas-phase polymerization of α-olefins, poly-α-olefins having a very low ash content are formed. The advantage of the process resides in the fact that on account of this low ash content an expensive work-up is not necessary.

The relationship between the stereospecificity, expressed by the ball indentation hardness of after-treatment-free gas-phase poly-α-olefins, and the catalyst activity, expressed by the catalyst-time-yield, is substantially more favorable as compared to other processes operating under the same conditions, but without component A or component B in the catalyst mixture. At the same catalyst-time-yields, in the process of the invention harder poly-α-olefins are obtained (Examples 5, 6, 12 and 13, and Comparative Tests 5, 6, 12 and 13). In the case of products of the same hardnesses, the catalyst-time-yield of the process of the invention is superior to that of a process without component A (Examples 4 and 14, Comparative Tests 4 and 14). In a comparative process without component B, the polymerization speed is slightly increased, but even after optimizing, for example in the case of polypropylene, the hardness range of 450 to 500 kiloponds per cm.$^2$ is not exceeded (Examples 11 and 2, Comparative Test 7). At the same polymerization speed, in the process of the invention harder polyolefins are obtained than in a process without component B (Examples 8 and 15, Comparative Tests 7 and 14). These advantages are surprising and could not be expected by someone skilled in the art.

The following examples and comparative tests illustrate the invention.

EXAMPLE 1

1.5 kg. of polypropylene prepared in the same manner as hereinafter described are introduced into a horizontal reactor having a capacity of 40 liters and being equipped with an agitator scraping along the walls. The reactor is flushed by pressing in and releasing propylene for several times, and then heated to 90° C. A solution of 8.8 ml. of aluminium triethyl and 0.56 ml. of phosphoric acid hexamethyl-trisamide and 0.32 ml. of cycloheptatriene-(1,3,5) in 40 ml. of heptane is added dropwise with agitation. After agitation for 5 minutes at 90° C. under normal pressure, a suspension of 3.19 g. of

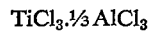

TiCl$_3$·⅓AlCl$_3$ in 30 ml. of heptane is added, which corresponds to a molar ratio of aluminium triethyl to phosphoric acid hexamethyl-trisamide to cycloheptatriene to titanium compound of 4:0.2:0.2:1. 1.5 kg./h. of propylene are then fed in, and the temperature is maintained at 90° C. The pressure is rising rapidly at first, more slowly later on. The reaction is stopped at a pressure of 20 atm./gage (8 hours). After release of the pressure, 15.5 kg. of colorless polypropylene are obtained without further purification; i.e., after deduction of the polypropylene amount fed in, the yield is 14.0 kg., which corresponds to a catalyst-time-yield of 108 g. per millimol of titanium compound and per hour. The ball indentation hardness of the product so obtained, measured according to DIN 53,456, is 520 kp./cm.$^2$.

COMPARATIVE TEST 1

Under otherwise the same conditions, a catalyst system composed of aluminium triethyl, cycloheptatriene-(1,3,5) and TiCl$_3$·⅓AlCl$_3$ in a ratio of 4:0.2:1 is used for the polymerization of propylene. A catalyst-time-yield of 104 g./mmol·h., relative to TiCl$_3$·⅓AlCl$_3$, results. The ball indentation hardness of the polypropylene obtained is 425 kp./cm.$^2$.

COMPARATIVE TEST 2

Under otherwise the same conditions as described in Example 1, cycloheptatriene-(1,3,5) is omitted in the catalyst system for comparative purposes. The catalyst-time-yield in this case is 120 g./mmol·h., relative to TiCl$_3$·⅓AlCl$_3$. The ball indentation hardness of the product obtained is 375 kp./cm.$^2$.

EXAMPLES 2 AND 3; COMPARATIVE TEST 3

The reactor having been prepared as indicated in Example 1, a solution of 8.8 ml. of aluminium triethyl and 2.80 ml. of phosphoric acid hexamethyl-trisamide in 40 ml. of heptane is introduced dropwise at 90° C., with agitation, into the reactor. Subsequently, in Example 2 1.25 ml., in Example 3 0.17 ml. and in Comparative Test 3 0 ml. of cycloheptatriene are dissolved in 10 ml. of heptane and added dropwise. The polymerization is carried out as indicated in Example 1. The results are listed in Table 1 as follows:

TABLE 1

| | Molar ratio Al:amide:CHT:Ti | Catalyst-time-yield [g./mmol·h.] | Ball indentation hardness [kp./cm.$^2$] |
|---|---|---|---|
| Example 2 | 4:1:0.75:1 | 80 | 650 |
| Example 3 | 4:1:0.1:1 | 115 | 520 |
| Comparative Test 3 | 4:1:0:1 | 115 | 450 |

In Example 2, the portion which can be extracted with heptane amounts to 8.3%. The reduced specific viscosity (0.1% in Dekalin at 135° C.) is 10.8.

EXAMPLES 4, 5, 6, 7, 8 AND COMPARATIVE TESTS 4, 5, 6, 7

Propylene is polymerized by the method described in Example 1, using a different mixture ratio of the catalyst components aluminium triethyl, phosphoric acid hexamethyl-trisamide, cycloheptatriene-(1,3,5) and

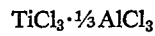

TiCl$_3$·⅓AlCl$_3$ in each case. The titanium compound is not added in the form of a suspension, but in the form of a powder mixture with polypropylene in a weight ratio of 1:10. In comparative tests, catalyst mixtures without phosphoric acid hexamethyl-trisamide or without cycloheptatriene are used. The results of the tests are listed in Table 2.

TABLE 2

| | Molar ratio Al:amide:CHT:Ti | Catalyst-time-yield [g./mmol·h.] | Ball indentation hardness [kp./cm.$^2$] |
|---|---|---|---|
| Example 4 | 4:1:0.13:1 | 110 | 525 |
| Comparative Test 4 | 4:—:0.45:1 | 78 | 525 |
| Example 5 | 4:1:0.33:1 | 100 | 610 |
| Comparative Test 5 | 4:—:0.15:1 | 100 | 450 |
| Example 6 | 4:0.8:0.2:1 | 100 | 560 |
| Comparative Test 6 | 4:1.25:—:1 | 100 | 460 |
| Example 7 | 4:0.25:0.2:1 | 105 | 520 |
| Comparative Test 7 | 4:2:—:1 | 90 | 480 |
| Example 8 | 4:2:0.2:1 | 90 | 580 |

EXAMPLE 9 AND COMPARATIVE TESTS 8 AND 9

1 liter of a hydrogenated, oxygen-free gasoline fraction (boiling point 145° to 162° C.) is introduced, with exclusion of air and humidity, into a vessel equipped with an agitator, a thermometer and a gas inlet tube, flushed with pure nitrogen and subsequently saturated with propylene at 55° C. Subsequently, 1.37 ml. of aluminium triethyl, 0.32 ml. of phosphoric acid hexamethyl-trisamide, 0.10 ml. of cycloheptatriene-(1,3,5) and a suspension of 995 mg. of TiCl$_3$·⅓AlCl$_3$ in 10 ml. of heptane are added one after the other, which corresponds to a molar ratio of 2:0.6:0.2:1. At first, the polymerization is carried out for 30 minutes at 55° C. with constant feeding-in of propylene. The temperature is then raised to 75° C. and the polymerization is carried out for a total of 5 hours. After having added 40 ml. of isopropanol, agitation is continued for one hour at 75° C., and the substance is then suction-filtered in hot state. After a thorough washing with the hot dispersing agent and acetone, and after drying in vacuo at 70° C., the amount of polypropylene indicated in Table 3 is obtained. In order to determine the soluble portion formed by the polymerization, at first the polypropylene insoluble in the dispersing agent is extracted for 24 hours with boiling heptane, and then the mother liquor and the washing solution are evaporated to dryness in vacuo.

In the comparative tests, phosphoric acid hexamethyl-trisamide and cycloheptatriene, respectively, are omitted.

TABLE 3

|  | Molar ratio Al:amide: CHT:Ti | Yield [grams] | Extracted [percent] | Soluble in mother-liquor [percent] | Soluble portions [percent] (total) |
|---|---|---|---|---|---|
| Example 9 | 2:0.6:0.2:1 | 310 | 2.6 | 5.9 | 8.5 |
| Comparative Test 8 | 2:—:0.2:1 | 305 | 3.8 | 15.7 | 19.5 |
| Comparative Test 9 | 2:0.6:—:1 | 320 | 3.3 | 12.9 | 16.2 |

EXAMPLE 10

1.5 kg. of polypropylene prepared in the same manner as hereinafter described are introduced into a horizontal reactor having a capacity of 40 liters and being equipped with an agitator scraping along the walls. The reactor is flushed by pressing in and releasing propylene for several times, and then heated to 90° C. A solution of 8.8 ml. of aluminium triethyl, 1.40 ml. of phosphoric acid hexamethyl-trisamide and 0.49 ml. of cyclo-octatetraene in 40 ml. of heptane is added dropwise with agitation. After agitation for 5 minutes at 90° C. under normal pressure, a suspension of 3.19 g. of $TiCl_3 \cdot \frac{1}{3}AlCl_3$ in 30 ml. of heptane is added, which corresponds to a molar ratio of aluminium triethyl to phosphoric acid hexamethyl-trisamide to cyclooctatetraene to titanium compound of 4:0.5:0.3:1. 1.5 kg./h. of propylene are then fed in, and the temperature is maintained at 90° C. The pressure is rising rapidly at first, more slowly later on. The reaction is stopped at a pressure of 20 atm./gage (7.5 hours). After release of the pressure, 14.8 kg. of colorless polypropylene are obtained without further purification; i.e., after deduction of the polypropylene amount fed in, the yield is 13.3 kg., which corresponds to a catalyst-time-yield of 110 g. per millimol of titanium compound and per hour. The ball indentation hardness of the product so obtained, measured according to DIN 53,456, is 540 kp./cm.²

EXAMPLE 11

Under otherwise the same conditions, a catalyst system of aluminium triethyl, phosphoric acid hexamethyl-trisamide, cyclo-octatetraene and $TiCl_3 \cdot \frac{1}{3}AlCl_3$ in a ratio of 4:1:1:1 is used for the polymerization of propylene. A catalyst-time-yield of 89 g./mmol.h., relative to $TiCl_3 \cdot \frac{1}{3}AlCl_3$, is obtained. The ball indentation hardness of the polypropylene obtained is 630 kg./cm.²

COMPARATIVE TESTS 10 AND 11

Under otherwise the same conditions, in the comparative tests phosphoric acid hexamethyl-trisamide and cyclo-octatetraene, respectively, are omitted. The catalyst-time-yields and ball indentation hardnesses of the products so obtained are listed in Table 4.

TABLE 4

|  | Molar ratio Al:amide: CHT:Ti | Catalyst-time-yield [g./mmol·h.] | Ball indentation hardness [kp./cm.²] |
|---|---|---|---|
| Example 11 | 4:1:1:1 | 94 | 620 |
| Comparative Test 10 | 4:0:1:1 | 95 | 540 |
| Comparative Test 11 | 4:1:0:1 | 115 | 450 |

In Example 11 the portion which can be extracted with heptane amounts to 9.4%. The reduced specific viscosity (0.1% in Dekalin at 135° C.) is 10.2.

EXAMPLES 12, 13, 14 AND COMPARATIVE TESTS 12, 13, 14, 15

Propylene is polymerized by the method described in Example 1, using a different mixture ratio of the catalyst components aluminium triethyl, phosphoric acid hexamethyl-trisamide, cyclo-octatetraene and $TiCl_3 \cdot \frac{1}{3}AlCl_3$ in each case. The titanium compound is not added in the form of a suspension, but in the form of a powder mixture with polypropylene in a weight ratio of 1:10. In comparative tests, catalyst mixtures without phosphoric acid hexamethyl-trisamide or without cyclo-octatetraene are used. The results of the tests are listed in Table 5.

TABLE 5

|  | Molar ratio Al:amide: CHT:Ti | Catalyst-time-yield [g./mmol·h.] | Ball indentation hardness [kp./cm.²] |
|---|---|---|---|
| Example 12 | 4:0.7:0.3:1 | 100 | 560 |
| Comparative Test 12 | 4:1.25:0:1 | 100 | 460 |
| Example 13 | 4:1:0.6:1 | 100 | 600 |
| Comparative Test 13 | 4:0:0.20:1 | 100 | 460 |
| Example 14 | 4:0.6:0.25:1 | 115 | 550 |
| Comparative Test 14 | 4:0:0.7:1 | 90 | 550 |
| Comparative | 4:2:—:1 | 90 | 480 |

EXAMPLE 15 AND COMPARATIVE TESTS 16 AND 17

1 liter of a hydrogenated, oxygen-free gasoline fraction (boiling point 145° to 162° C.) is introduced, with exclusion of air and humidity, into a vessel equipped with an agitator, a thermometer and a gas inlet tube, flushed wtih pure nitrogen and subsequently saturated with propylene at 55° C. Subsequently, 1.37 ml. of aluminium triethyl, 0.32 ml. of phosphoric acid hexamethyl-trisamide, 0.11 ml. of cyclo-octatetraene and a suspension of 995 mg. of $TiCl_3 \cdot \frac{1}{3}AlCl_3$ in 10 ml. of heptane are added one after the other, which corresponds to a molar ratio of 2:0.6:0.2:1. At first, the polymerization is carried out for 30 minutes at 55° C. with constant feeding-in of propylene. The temperature is then raised to 75° C., and the polymerization is carried out for a total of 5 hours. After having added 40 ml. of isopropanol, agitation is continued for one hour at 75° C., and the substance is then suction-filtered in hot state. After a thorough washing with the hot dispersing agent and acetone and after drying in vacuo at 70° C., the amount of polypropylene indicated in Table 6 is obtained. In order to determine the soluble portion formed by the polymerization, at first the polypropylene insoluble in the dispersing agent is extracted for 24 hours with boiling heptane, and then the mother liquor and washing solution are evaporated to dryness in vacuo.

In comparative tests, phosphoric acid-hexamethyl-trisamide and cyclo-octatetraene, respectively, are omitted.

TABLE 6

|  | Molar ratio Al:amide: CHT:Ti | Yield [grams] | Extracted [percent] | Soluble in mother-liquor [percent] | Soluble portions [percent] (total) |
|---|---|---|---|---|---|
| Example 15 | 2:0.6:0.2:1 | 280 | 2.6 | 7.1 | 9.7 |
| Comparative Test 16 | 2:—:0.2:1 | 280 | 3.6 | 16.9 | 20.5 |
| Comparative Test 17 | 2:0.6:—:1 | 295 | 3.3 | 12.9 | 16.2 |

What is claimed is:

1. Mixed catalyst for the polymerization of α-olefins, composed of:
(a) 0.5 to 5 moles of a phoshoric acid-N-alkylamide of the formula

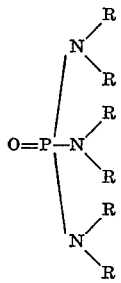

in which R stands for identical or different aliphatic hydrocarbon radicals having up to 4 carbon atoms, and in which the radicals R may also be linked with each other (component A),
(b) 0.1 to 1.5 moles of a cyclopolyalkene having 7 or 8 ring members and 3 non-cumulated double bonds in the ring, or 0.1 to 2.5 moles of cyclopolyalkene having 8 ring members and 3 or 4 non-cumulated double bonds, respectively, in the ring, or mixtures thereof, or the alkyl and alkoxy substituted derivatives thereof or mixtures thereof, the alkyl radical containing from 1 to 4 carbon atoms (component B),
(c) 1 mole of a halogen compound of trivalent titanium (component C), and
(d) 0.5 to 15 moles of a halogen-free organo-aluminium compound (component D).

2. Mixed catalyst as claimed in claim 1, wherein as phosphoric acid-N-alkylamide phosphoric acid hexamethyl-trisamide is used.

3. Mixed catalyst as claimed in claim 1, wherein the molar ratio of phosphoric acid hexamethyl-trisamide to halogen compound is from 0.05 to 5.0.

4. Mixed catalyst as claimed in claim 1, wherein as component B cycloheptatriene-(1,3,5) is used.

5. Mixed catalyst as claimed in claim 1, wherein as component B cyclo-octatetraene is used.

6. Mixed catalyst as claimed in claim 1, wherein the molar ratio of component B to component C, in the case of using cycloheptatriene-(1,3,5) or norcaradiene, is from 0.1 to 1.5, and, in the case of using cyclo-octatetraene, from 0.1 to 2.5.

7. Mixed catalyst as claimed in claim 1, wherein as component B a mixture of cyclo-octatetraene and cyclo-octatriene is used.

8. Mixed catalyst as claimed in claim 1, wherein as halogen compound of trivalent titanium chlorine compounds are used which are prepared by reduction of $TiCl_4$ with Al, $H_2$ or organo-aluminium compounds.

9. Mixed catalyst as claimed in claim 6, wherein as chlorine compound of trivalent titanium $TiCl_3 \cdot \frac{1}{3} AlCl_3$ is used.

10. Mixed catalyst as claimed in claim 1, wherein as halogen-free organo-aluminium compound aluminium triethyl is used.

11. Process for the polymerization of α-olefins of the general formula $CH_2=CH-R$, in which R is an aliphatic radical having up to 4 carbon atoms, in suspension or in the gaseous phase at temperatures of from 20° to 130° C. and pressures of from 0 to 50 atmospheres/gage, which comprises carrying out the polymerization in the presence of a mixed catalyst as claimed in claim 1.

12. Process as claimed in claim 11, wherein as α-olefin propylene is used.

13. Process as claimed in claim 11, wherein the polymerization is carried out in the gaseous phase in a temperature range of from 70° to 110° C. and under pressures of from 15 to 45 atmospheres/gage.

References Cited
UNITED STATES PATENTS

| 3,549,608 | 12/1970 | Coover, Jr. et al. | 252—429 B |
| 3,639,375 | 2/1972 | Staiger et al. | 260—94.9 C |
| 3,362,944 | 1/1968 | Eichenbaum et al. | 260—94.9 C |

FOREIGN PATENTS

| 1,940,329 | 2/1971 | Germany | 260—94.9 C |

JOSEPH L. SCHOFER, Primary Examiner

A. HOLLER, Assistant Examiner

U.S. Cl. X.R.

252—429 C; 260—88.2 B, 94.9 C, 94.9 CB, 878 B